(12) United States Patent
Ogawa et al.

(10) Patent No.: US 12,046,000 B2
(45) Date of Patent: Jul. 23, 2024

(54) LEARNING DEVICE, OBJECT DETECTION DEVICE, LEARNING METHOD, AND RECORDING MEDIUM

(71) Applicant: NEC Corporation, Tokyo (JP)

(72) Inventors: Takuya Ogawa, Tokyo (JP); Takashi Shibata, Tokyo (JP); Tetsuaki Suzuki, Tokyo (JP); Hiroyoshi Miyano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 414 days.

(21) Appl. No.: 17/618,550

(22) PCT Filed: Jun. 25, 2019

(86) PCT No.: PCT/JP2019/025075
§ 371 (c)(1),
(2) Date: Dec. 13, 2021

(87) PCT Pub. No.: WO2020/261362
PCT Pub. Date: Dec. 30, 2020

(65) Prior Publication Data
US 2022/0414918 A1      Dec. 29, 2022

(51) Int. Cl.
*G06T 7/73*          (2017.01)
*G06V 10/25*        (2022.01)
(Continued)

(52) U.S. Cl.
CPC ............... *G06T 7/73* (2017.01); *G06V 10/25* (2022.01); *G06V 10/761* (2022.01); *G06V 10/7715* (2022.01); *G06T 2207/20081* (2013.01)

(58) Field of Classification Search
CPC ............ G06T 7/73; G06T 2207/20081; G06T 2207/20084; G06T 2207/20016;
(Continued)

(56) References Cited

U.S. PATENT DOCUMENTS 10,311,335 B1      6/2019   Kim et al.
10,325,201 B1      6/2019   Kim et al.
(Continued)

FOREIGN PATENT DOCUMENTS

CN         109800768 A       5/2019
JP         2018-005520 A     1/2018
(Continued)

OTHER PUBLICATIONS

International Search Report for PCT Application No. PCT/JP2019/025075, dated Sep. 10, 2019.
(Continued)

*Primary Examiner* — Stephen P Coleman
(74) *Attorney, Agent, or Firm* — Sughrue Mion, PLLC

(57) ABSTRACT

A learning device makes an object detection device learn how to detect an object from an input image. A feature extraction unit performs feature extraction from input images including real images and pseudo images to generate feature maps, and the object detection unit detects objects included in the input images based on the feature maps. The domain identification unit identifies the domains forming the input images and generates domain identifiability information. Then, the feature extraction unit and the object detection unit learn common features that do not depend on the difference in domains, based on the domain identifiability information.

10 Claims, 11 Drawing Sheets

(51) Int. Cl.
*G06V 10/74* (2022.01)
*G06V 10/77* (2022.01)

(58) Field of Classification Search
CPC .. G06V 10/25; G06V 10/761; G06V 10/7715; G06V 10/82

USPC .......................................................... 382/103
See application file for complete search history.

(56) References Cited

U.S. PATENT DOCUMENTS

| | | |
|---|---|---|
| 2019/0073567 A1 | 3/2019 | Itou et al. |
| 2019/0251383 A1 | 8/2019 | Senay et al. |

FOREIGN PATENT DOCUMENTS

| | | |
|---|---|---|
| JP | 2018-077829 A | 5/2018 |
| JP | 2019-046390 A | 3/2019 |
| JP | 2020-126608 A | 8/2020 |

OTHER PUBLICATIONS

Shaoging Ren et al., "Faster R-CNN Towards Real-Time Object Detection with Region Proposal Networks", IEEE Transactions on Pattern Analysis and Machine Intelligence, vol. 39, No. 6, Jun. 2017, pp. 1137-1149.
Ross Girshick et al., "Fast R-CNN 2015", IEEE International Conference on Computer Vision, Dec. 7-13, 2015, Santiago, Chile, pp. 1440-1448.
JP Office Action for JP Application No. 2021-528683, dated Jul. 11, 2023 with English Translation.
Yaroslav Ganin et al,"Unsupervised Domain Adaptation by Backpropagation", ICML'15: Proceedings of the 32nd International Conference on Machine Learning—vol. 37, Jul. 2015, pp. 1180-1189, Skolkovo Institute of Science and Technology, Moscow Region, Russia.
Yaroslav Ganin at al, "Domain-Adversarial Training of Neural Networks", The Journal of Machine Learning Research vol. 17, Jan. 1, 2016, pp. 2096-2030, Skolkovo Institute of Science and Technology, Skolkovo, Moscow Region, Russia.
JP Office Action for JP Application No. 2021-528683, dated Jan. 24, 2023 with English Translation.
Miyamoto Glichiro et al., "PyTorch Neural Network Implementation Handbook," first edition, Jan. 1, 2019, Shuwa System Co., Ltd., pp. 182 to 204.
Imoto Takashi, "the textbook of A.I. Artificial Intelligence", the 1st edition, Jun. 10, 2019, Nikkei Business Publications, the 400-409th page.

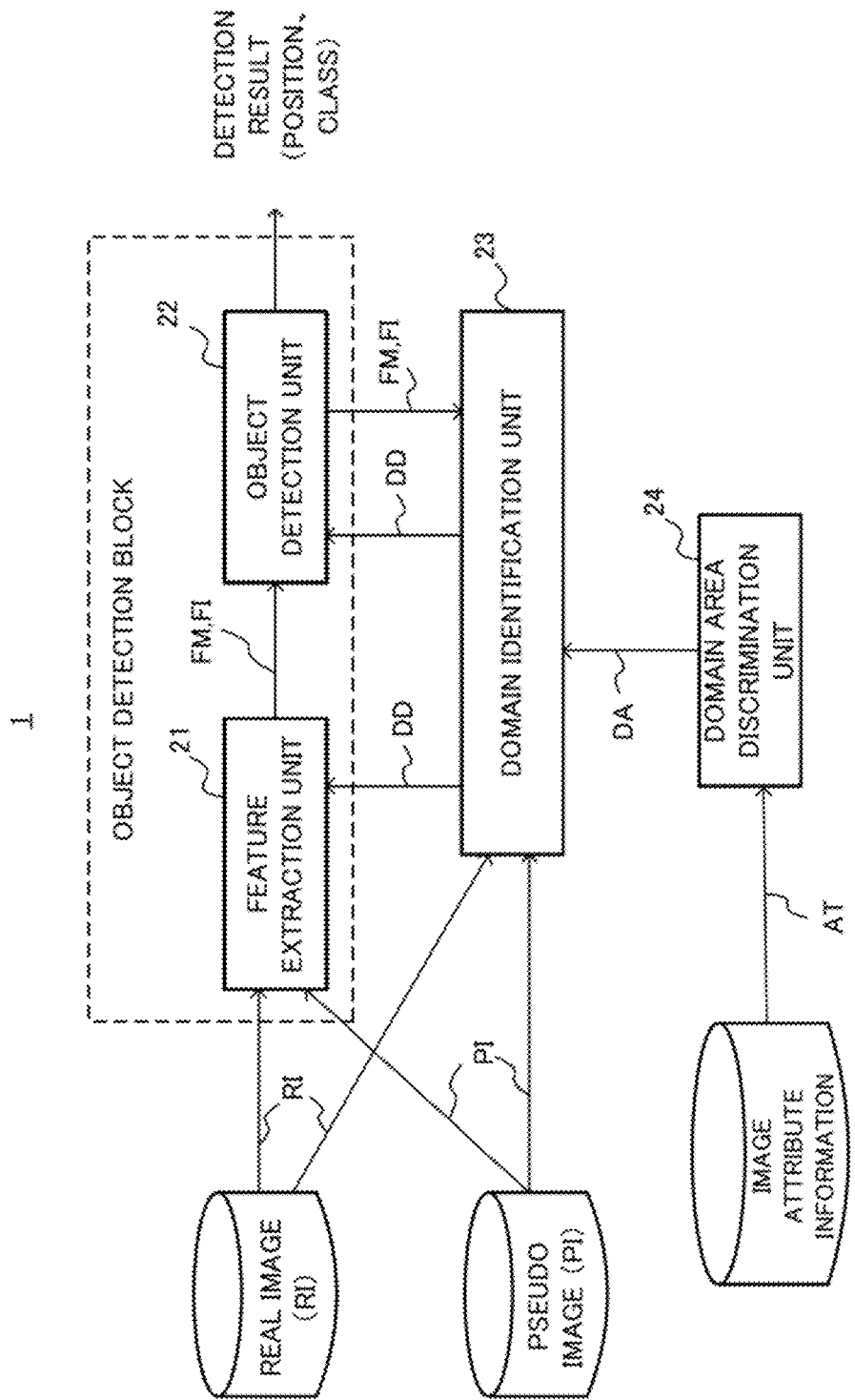

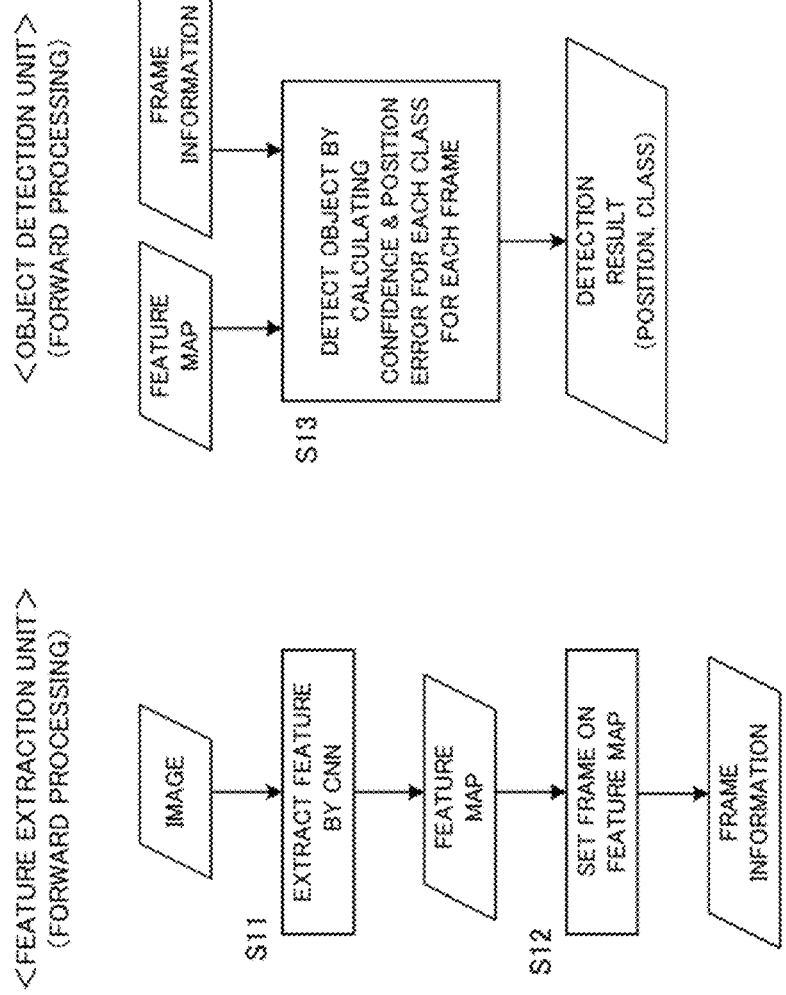

FRAME INFORMATION
FI = (x, y, w, h)

LEARNING DEVICE, OBJECT DETECTION DEVICE, LEARNING METHOD, AND RECORDING MEDIUM

This application is a National Stage Entry of PCT/JP2019/025075 filed on Jun. 25, 2019, the contents of all of which are incorporated herein by reference, in their entirety.

TECHNICAL FIELD

The present invention relates to a technique for detecting objects contained in images.

BACKGROUND ART

Object detection technique using deep learning is known. Patent Documents 1 and 2 describe a technique that uses a neural network for detecting an object by extracting feature maps in convolution processing.

PRECEDING TECHNICAL REFERENCES

Patent Document

Patent Document 1: Japanese Patent Application Laid-Open under No. 2018-77829
Patent Document 2: Japanese Patent Application Laid-Open under No. 2018-5520

SUMMARY OF INVENTION

Problem to be Solved by the Invention

In order to ensure detection accuracy in object detection using deep learning, it is necessary to prepare data of enormous amounts and variations about an object in advance, and to perform learning using them. However, it may be sometimes difficult to prepare a large amount of data in terms of costs such as time and expense required for acquiring and processing data. Also, it is difficult to prepare a sufficient amount of data if the target of detection is a rare event or an event that is difficult to predict.

It is an example object of the present invention is to provide object detection technique capable of ensuring practical accuracy at low cost even when it is difficult to prepare a large amount of data for the case such as a rare event or an event that is difficult to predict.

Means for Solving the Problem

According to one aspect of the present invention, there is provided a learning device comprising:
  a feature extraction unit configured to perform feature extraction from input images including real images and pseudo image to generate feature maps;
  an object detection unit configured to detect objects included in the input images based on the feature maps; and
  a domain identification unit configured to identify domains forming the input images and outputting domain identifiability information,
  wherein the feature extraction unit and the object detection unit learn common features that do not depend on difference in domains, based on the domain identifiability information.

According to another aspect of the present invention, there is provided a learning method of an object detection device for extracting a feature from an input image and detecting an object included in the input image, comprising:
  inputting input images including real images and pseudo images to the object detection device;
  identifying domains forming the input images to generate domain identifiability information; and
  making the object detection device learn common features that do not depend on difference in domains, based on the domain identifiability information.

According to still another aspect of the present invention, there is provided a recording medium recording a program to execute learning processing of an object detection device including a computer, the object detection device extracting a feature from an input image and detecting an object included in the input image, the program causing the computer to execute:
  inputting input images including real images and pseudo images to the object detection device;
  identifying domains forming the input images to generate domain identifiability information; and
  making the object detection device learn common features that do not depend on difference in domains, based on the domain identifiability information.

Effect of the Invention

According to the present invention, even when it is difficult to prepare a large amount of data for the case such as a rare event or an event difficult to predict, it is possible to perform object detection with practical accuracy at low cost.

BRIEF DESCRIPTION OF THE DRAWINGS

FIG. 4 is a block diagram showing a functional configuration of the learning device.
FIGS. 5A to 5C are flowcharts showing forward processing of a feature extraction unit, an object detection unit, and a domain identification unit.

EXAMPLE EMBODIMENTS

[Images and Domains]
In the present example embodiment, pseudo images are used to perform learning of an object detection device using a large number of images. For a rare event or an event that is difficult to predict, it is difficult to obtain a sufficient number of real images. Therefore, the accuracy of object detection is improved by performing learning using a large number of pseudo images in addition to a small number of real images.

Figure 1A:
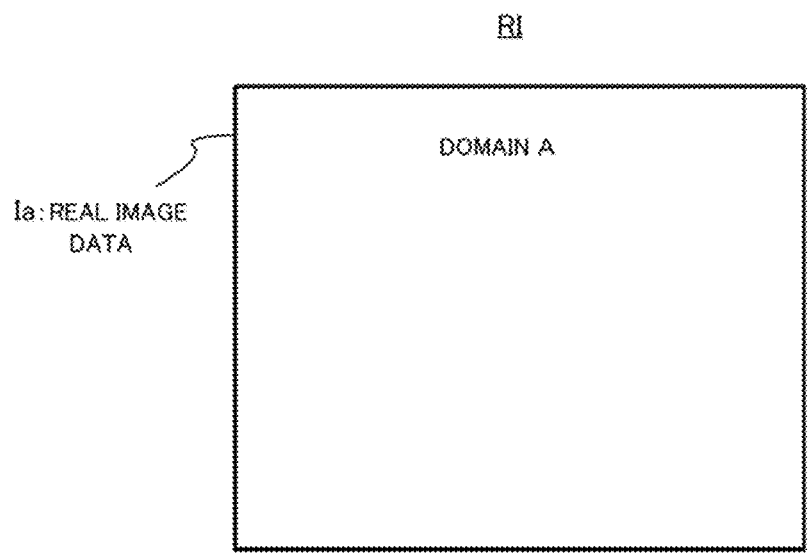
FIGS. 1A and 1B show concept of real image and pseudo image.

First, a real image and a pseudo image will be described. "Real image" refers to an image that captures a real situation. FIG. 1A shows the concept of a real image RI. The real image RI is an image, the entirety of which is actually taken image. In this specification, the term "image" is intended to refer to the entire image, and a portion of the image, i.e., the partial data of the image is referred to as "image data" to distinguish between the two. Therefore, one image actually taken is called the real image RI, and its partial data is called the real image data Ia. The real image RI consists only of the real image data Ia.

Figure 1B:
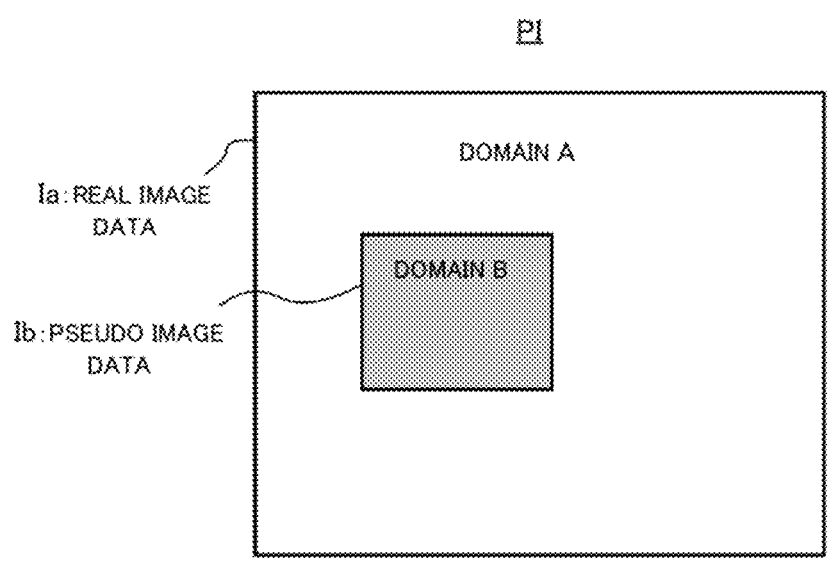

In contrast, "pseudo image" refers to an image artificially created by synthesizing the images. FIG. 1B shows the concept of the pseudo image PI. The pseudo image PI is created by synthesizing the real image data Ia and the pseudo image data Ib. That is, the pseudo image PI includes the real image data Ia and the pseudo image data Ib. The pseudo image data Ib is a part of another image, image data created by computer graphics, or the like.

Now, the domain of the real image RI is defined as "Domain A".

"Domain" means a region or a distribution where image data is obtained. A group of image data obtained in the same environment or conditions is called image data of the same domain. In this case, the domain of the real image data Ia which is a part of the real image RI is also "domain A". As shown in FIG. 1A, the entirety of the real image RI is "domain A". In contrast, the domain of the pseudo image PI is defined as "Domain B". As shown in FIG. 1B, for the pseudo image PI, the portion of the real image data Ia is the domain A, and the portion of the pseudo image data Ib is the domain B.

Thus, in the present example embodiment, the real image data Ia obtained from a small number of real images and the pseudo image data Ib are synthesized to create a large number of pseudo images PI, and the learning of the object detection device is performed using those pseudo images PI. While the pseudo image data Ib is synthesized at only a part of the real image RI to create the pseudo image PI in the example of FIG. 1B, the pseudo image PI may be created by synthesizing the pseudo image data Ib at plural parts of the real image RI. That is, the pseudo image PI may include a plurality of pseudo image data Ib. Also, the entire pseudo image PI may be of the pseudo image data Ib.

First Example Embodiment

Next, a first example embodiment of the present invention will be described.

(Hardware Configuration)

Figure 2:
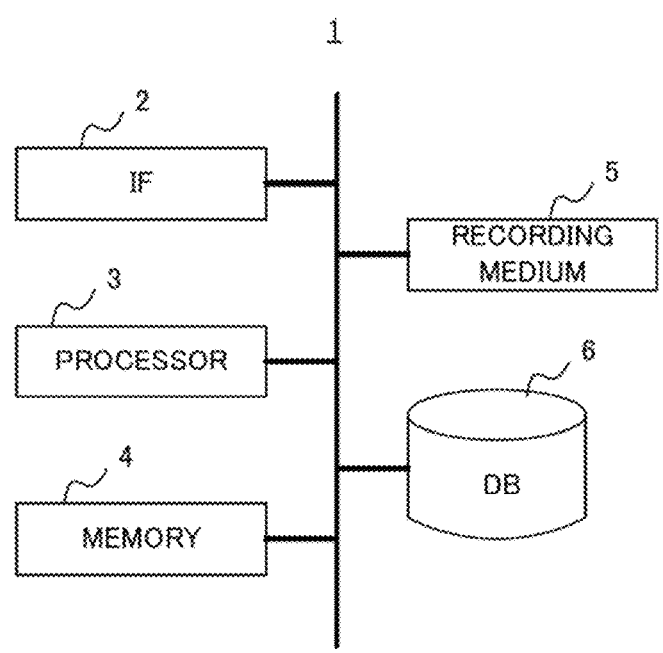
FIG. 2 is a block diagram showing a hardware configuration of a learning device according to the first example embodiment.

FIG. 2 is a block diagram illustrating a hardware configuration of the learning device according to the first example embodiment. As illustrated, the learning device 1 includes an interface (IF) 2, a processor 3, a memory 4, a recording medium 5, and a database (DB) 6.

The interface 2 communicates with an external device. Specifically, the interface 2 is used to input images subjected to the object detection from outside or to output the result of the object detection to an external device.

The processor 3 is a computer such as a CPU (Central Processing Unit) or a combination of a CPU and a GPU (Graphics Processing Unit), and controls the entire learning device 1 by executing a program prepared in advance. The memory 4 is composed of a ROM (Read Only Memory), a RAM (Random Access Memory), or the like. The memory 4 stores various programs to be executed by the processor 3. Also, the memory 4 is used as a work memory during execution of various processing by the processor 3.

The recording medium 5 is a non-volatile and non-transitory recording medium such as a disk-shaped recording medium, a semiconductor memory, or the like, and is configured to be detachable from the learning device 1. The recording medium 5 records various programs to be executed by the processor 3. When the learning device 1 executes the learning processing, a program recorded on the recording medium 5 is loaded into the memory 4 and executed by the processor 3.

The database 6 stores images used in the learning processing of the object detection device. Specifically, the database 6 stores the real images and the pseudo images. Also, the database 6 stores attribute information (hereinafter, referred to as "image attribute information") of the real images and the pseudo images.

(Principles)

Figure 3:
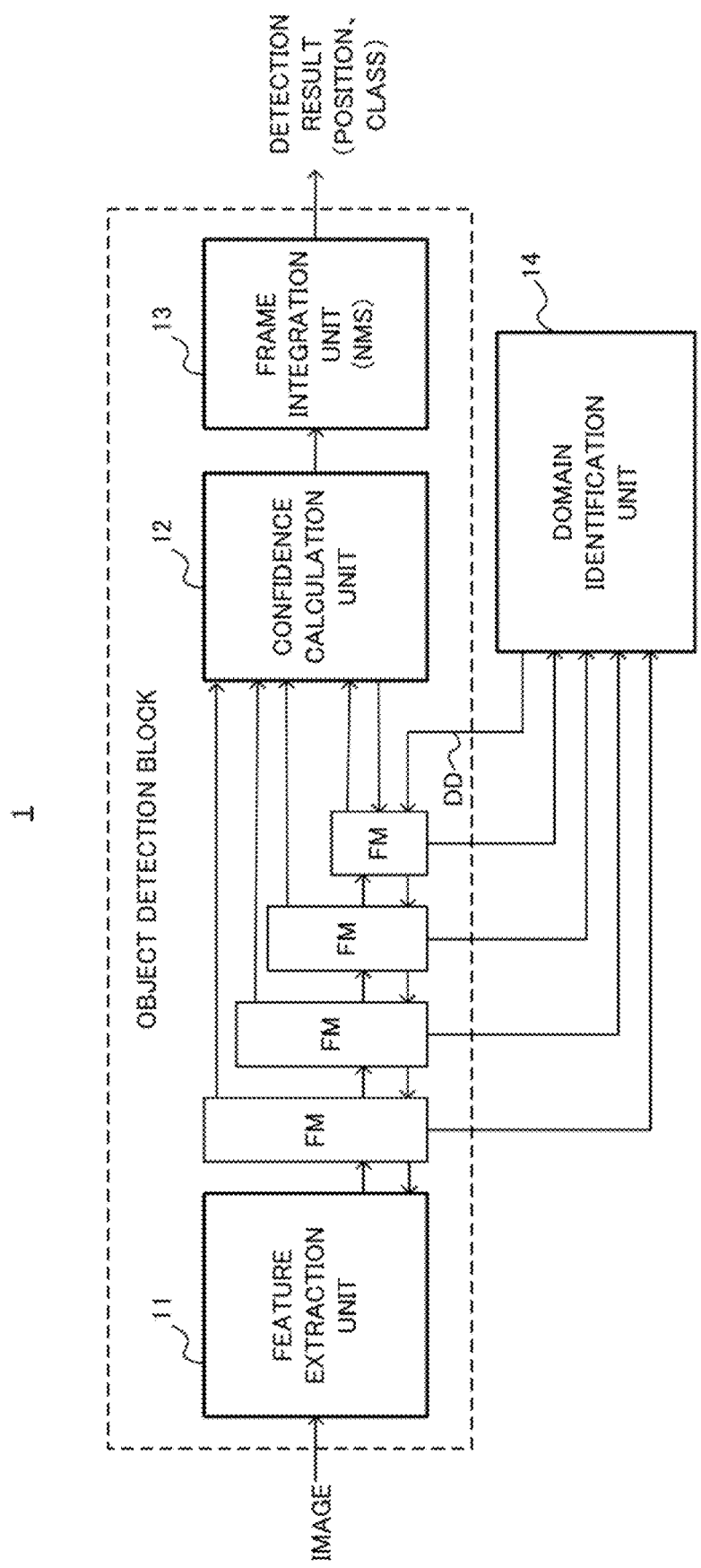
FIG. 3 shows a basic principle of the learning device.

Next, the basic principle of the learning processing according to the present example embodiment will be described. The learning processing of the present example embodiment is make an object detecting device learn how to detect an object from an image. FIG. 3 shows the basic principle of the learning device 1. The learning device 1 includes a feature extraction unit 11, a confidence calculation unit 12, a frame integration unit 13, and a domain identification unit 14. The feature extraction unit 11, the confidence calculation unit 12, and the frame integration unit 13 form a block corresponding to an object detecting device (hereinafter referred to as an "object detection block"), and basically operate according to the object detecting algorithm SSD (Single Shot Multibox Detector).

Images are inputted to the feature extraction unit 11. At the time of learning, the real images and the pseudo images are inputted to the feature extraction unit 11. The feature extraction unit 11 is formed by a convolutional neural network (CNN: Convolutional Neural Network), and generates feature maps FM (Feature Map) of different scales by performing convolution and pooling for the inputted images. The features extracted by the feature extraction unit 11 propagate through the layer of each feature map FM and are supplied to the confidence calculation unit 12. Further, the layer of each feature map FM also performs feature extraction, and the extracted features propagate through the layer of each feature map FM and are supplied to the confidence calculation unit 12.

The confidence calculation unit 12 assigns a plurality of frames (boxes) prepared in advance to each cell forming the feature map FM, and calculates the confidence for each class of the object to be detected for each frame. For example, when "person," "horse," and "car" are set as the classes of the object to be detected, the confidence calculation unit 12 calculates the confidence that the image belonging to each frame is "person," the confidence that the image is "horse," and the confidence that the image is "car." The confidence calculation unit 12 performs this processing for all the feature maps FM of different scales generated by the feature extraction unit 11.

The frame integration unit 13 integrates overlapping frames recognized as the same class using the NMS (Non-Maximum Suppression) algorithm. For example, when a plurality of frames corresponding to a portion of an image are recognized as the same class (e.g., "person") by the confidence calculation unit 12, the frame integration unit 13 integrates those frames to one frame. Then, the frame integration unit 13 outputs the detection result including the position in the image and the class for each integrated frame.

On the other hand, the feature maps FM of the different scales generated by the feature extraction unit 11 are also inputted to the domain identification unit 14. Similarly to the confidence calculation unit 12, the domain identification unit 14 sets the frames for each cell of the feature map FM and identifies the domain for each frame. Specifically, the domain identification unit 14 identifies whether the image data included in the set frame is the domain A corresponding to the real image data Ia or the domain B corresponding to the pseudo image data Ib. Then, the domain identification unit 14 generates the domain identifiability information DD. The domain identifiability information is information for identifying the domain, and specifically the information indicating the difference between the domain A and the domain B.

The domain identifiability information DD generated by the domain identification unit 14 is supplied to the feature extraction unit 11 by backpropagating the layer of each feature map FM. Since the layer of each feature map FM performs feature extraction, the domain identifiability information DD is inputted to the deepest layer of the feature maps FM, and backpropagates the layers the feature maps FM therefrom to the feature extraction unit 11. Then, the feature extraction unit 11 learns such that it cannot identify the domain based on the domain identifiability information DD supplied from the domain identification unit 14. In other words, the feature extraction unit 11 performs learning so as to extract features common to the domain A and the domain B. Thus, the object detection block is trained to perform object detection with high accuracy using both the real images and the pseudo images.

As described above, in order to detect objects with high accuracy in the object detection block, a large amount of data is required. So, it is difficult to prepare a sufficient number of real images so that learning can be performed only with the real images. On the other hand, when learning of the object detection block is performed using only the pseudo images, the object detection block becomes possible to correctly detect the object from the pseudo images, but becomes impossible to correctly detect the object from the real images. Therefore, in the present example embodiment, both the real images and the pseudo images are used. The feature extraction unit 11 learns to extract a feature which cannot distinguish the domain, i.e., a common feature which does not depend on the difference between the domains, so that the object detection block after the learning can correctly detect the object from the real images.

Normally, domain adaptation is carried out for the attention region, and there is a question in affinity with the object detection processing which processes the whole image. Therefore, in the present invention, the concept of "frame" used in the object detection processing (CNN) is used as a target of domain adaptation, thereby enabling the application of domain adaptation.

(Learning Device)

FIG. 4 is a block diagram showing the functional configuration of the learning device 1. The learning device 1 functionally includes a feature extraction unit 21, an object detection unit 22, a domain identification unit 23, and a domain area discrimination unit 24. It is noted that the feature extraction unit 21 and the object detection unit 22 correspond to the object detection block.

The feature extraction unit 21 is configured by the CNN and extracts features from the input image. FIG. 5A is a flowchart of forward (Fw) processing of the feature extraction unit 21. The real images RI and the pseudo images PI are inputted to the feature extraction unit 21 as the input images. The feature extraction unit 21 performs feature extraction for the input image by convolution and pooling using the CNN, and generates feature maps FM (Step S11). The feature extraction unit 21 generates the feature maps FM of different scales by performing processing of multiple stages.

Figure 6A:
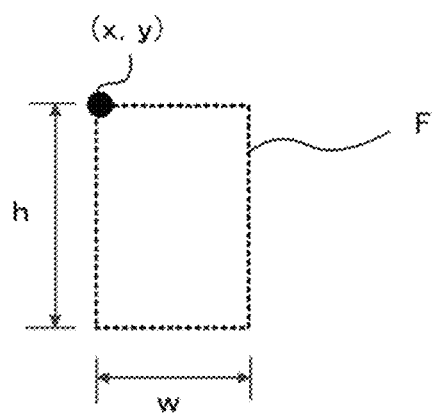
FIGS. 6A and 6B shows frame information and domain area information.

Next, the feature extraction unit 21 sets frames on the feature map FM and outputs the frame information FI for each of the generated feature maps FM. The feature map FM has a matrix structure in which plural cells are arranged in the vertical and horizontal directions, and the feature extraction unit 21 assigns a plurality of frames prepared in advance to each cell. For each cell, a plurality of frames having different size and aspect ratio are assigned. Then, the feature extraction unit 21 generates the frame information FI based on the image data belonging to each frame. The frame information FI is information indicating the position of the frame in the entire image, and including the position (x,y) of the upper left point of the frame, the width "w", and the height "h" as shown in FIG. 6A, for example. Then, the feature extraction unit 21 outputs the feature maps FM and the frame information FI to the object detection unit 22.

The object detection unit 22 detects an object in the image based on the feature maps FM and the frame information FI. FIG. 5B is a flowchart of forward processing of the object processing unit 22. The object detection unit 22 receives the feature maps FM and the frame information FI, detects the object by calculating the confidence and the position error for each class for each frame (Step S13), and outputs the detection result. Specifically, the object detection unit 22 computes the confidence for each class of the objects belonging to the frame for each of the plurality of frames set on each feature map FM. Then, using the NMS algorithm, the object detection unit 22 integrates the frames recognized as the same class to detect the object. The detection results of the object include, for each integrated frame, the position of the frame and the class of the object.

The domain identification unit 23 identifies the domain for each frame of the image inputted to the feature extraction unit 21. FIG. 5C is a flowchart of forward processing of the domain identification unit 23. The domain identification unit 23 identifies the domain of the image for each frame based on the feature maps FM and the frame information FI inputted from the object detection unit 22 (Step S14). Specifically, the domain identification unit 23 determines whether the frame is the domain A corresponding to the real image data Ia or the domain B corresponding to the pseudo image data Ib based on the image data belonging to each frame, and generates a domain identification result indicating one of the domain A and the domain B.

The domain area discrimination unit 24 generates the domain area information DA based on the image attribute information AT, and outputs the domain area information DA to the domain identification unit 23. The image attribute information AT is information on the attributes of the real image RI and the pseudo image PI, and includes information on the areas of the real image data Ia and the pseudo image data Ib in the image. For example, as to the real image RI, the image attribute information AT includes information indicating that the entire area of the image is the real image data Ia. As to the pseudo image PI, the image attribute information AT includes information indicating the area of the real image data Ia and the area of the pseudo image data Ib in the entire area of the image.

Based on the image attribute information AT, the domain area discrimination unit 24 discriminates the area of the domain A (i.e., the area of the real image data Ia) and the area of the domain B (i.e., the area of the pseudo image data Ib) in the real image RI and the pseudo image PI to generate the domain area information DA, and outputs the domain area information DA to the domain identification unit 23. As shown in FIGS. 1A and 1B, the domain area information DA is information indicating the areas of the domain A and the domain B in the real image RI and the pseudo image PI.

Figure 7:
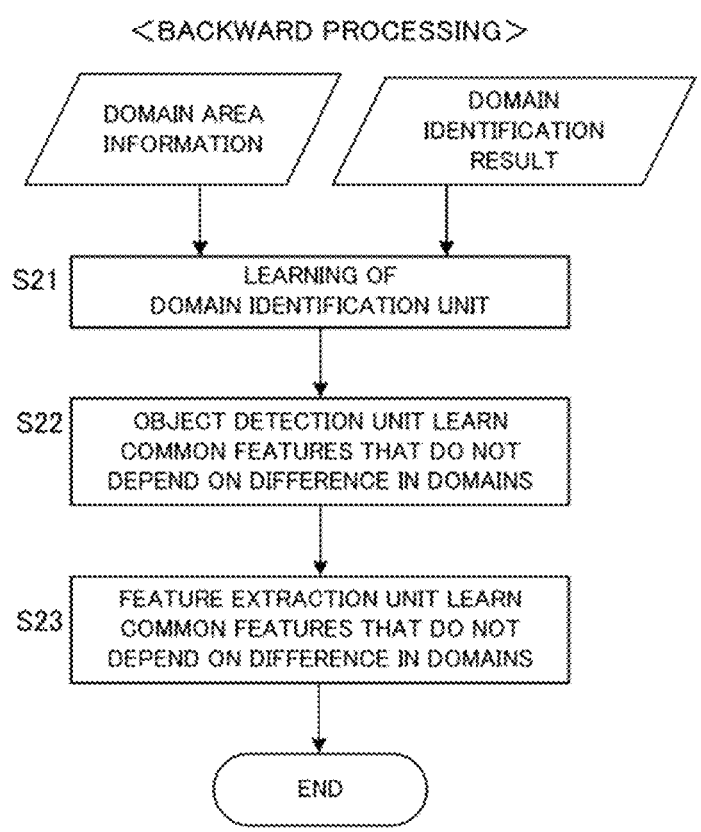
FIG. 7 is a flowchart of backward processing of the feature extraction unit, the object detection unit, and the domain identification unit.

Next, the backward processing of the learning device 1 will be described. The backward processing is to train the feature extraction unit 21, the object detection unit 22, and the domain identification unit 23 using the domain identification result and the detection result of the object. FIG. 7 is a flowchart of the backward processing of the feature extraction unit 21, the object detection unit 22, and the domain identification unit 23.

Figure 6B:
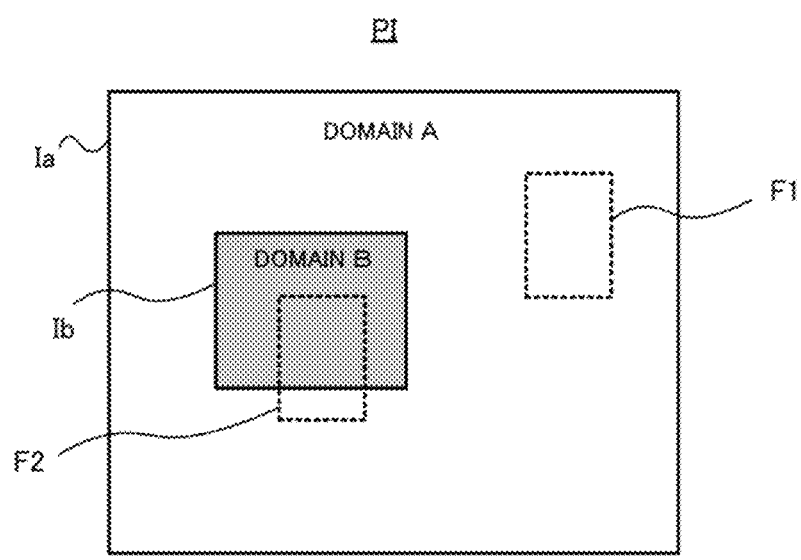

First, the domain identification unit 23 acquires the domain area information DA for each image from the domain area discrimination unit 24, and generates correct answer data of the domain identification result for each frame. FIG. 6B shows how to create correct answer data for domain identification results. As shown in FIG. 6B, the domain area information DA shows the areas of the domain A and the domain B in the pseudo image PI. The domain identification unit 23 determines which of the domains A and B the frame belongs to, based on the frame information FI acquired from the object detection unit 22. For example, in FIG. 6B, since the frame F1 as a whole belongs to the domain A, the domain identification unit 23 determines the domain of the frame F1 as the domain A. On the other hand, since the frame F2 mostly belongs to the domain B, the domain identification unit 23 determines the domain of the frame F2 as the domain B. Thus, the domain identification unit 23 generates correct answer data of the domain identification result for each frame, using the domain area information DA.

Then, the domain identification unit 23 performs learning using the correct answer data of the domain identification result thus generated and the domain identification result generated in Step S14 in the forward processing (Step S21). Specifically, this learning is performed by updating the parameters of the model constituting the domain identification unit 23 based on the error between the identification result by the domain identification unit 23 and the correct answer data of the domain identification result. By performing learning using a large number of images including the real images RI and the pseudo images PI, the domain identification unit 23 becomes possible to identify the domain A and the domain B based on the frame information FI supplied from the object detection unit 22. When the domain identification unit 23 becomes possible to identify the domain by the learning, the domain identification unit 23 supplies information for identifying the domain A and the domain B to the feature extraction unit 21 and the object detection unit 22 as the domain identifiability information DD. The domain identifiability information DD may be information indicating a difference between the domain A and the domain B, information indicating a feature that is not common to the domain A and the domain B, information indicating a feature that is unique to each of the domain A and the domain B, or the like.

Incidentally, it is preferable that the domain identification unit 23 performs learning using the correct answer data, among the correct answer data generated using the domain area information DA, for which the overlap rate between each domain area and the frame is equal to or greater than a constant. Namely, for example, since a frame that is overlapping with the domain A and the domain B half-and-half can be recognized as either domain, such a frame is not suitable as learning data for improving the identification accuracy. Also, it is preferable to prepare the correct answer data used for learning of the domain identification unit 23 such that the ratio of the data whose correct answer is the domain A and the data whose correct answer is the domain B becomes a predetermined ratio. This is because, if the data whose correct answer is either domain are too many or too few, the improvement of domain discrimination accuracy by learning cannot be expected.

Next, using the domain identifiability information DD, the object detection unit 22 learns common features that do not depend on difference in domains (Step S22). Specifically, the object detection unit 22 performs learning so as to detect an object without being affected by the difference in domains. Specifically, the learning here is performed by updating the parameters of the CNN constituting the object detection unit 22 based on the features extracted by the object detection unit 22 and the domain identifiability information DD.

Next, using the domain identifiability information DD, the feature extraction unit 21 learns common features that do not depend on difference in domains (Step S23). Specifically, the feature extraction unit 21 performs learning so as to extract features without being affected by difference in domains. Specifically, the learning here is performed by updating the parameters of the CNN constituting the feature extraction unit 21 based on the features extracted by the feature extraction unit 21 and the domain identifiability information DD.

(Learning Processing)

Figure 8:
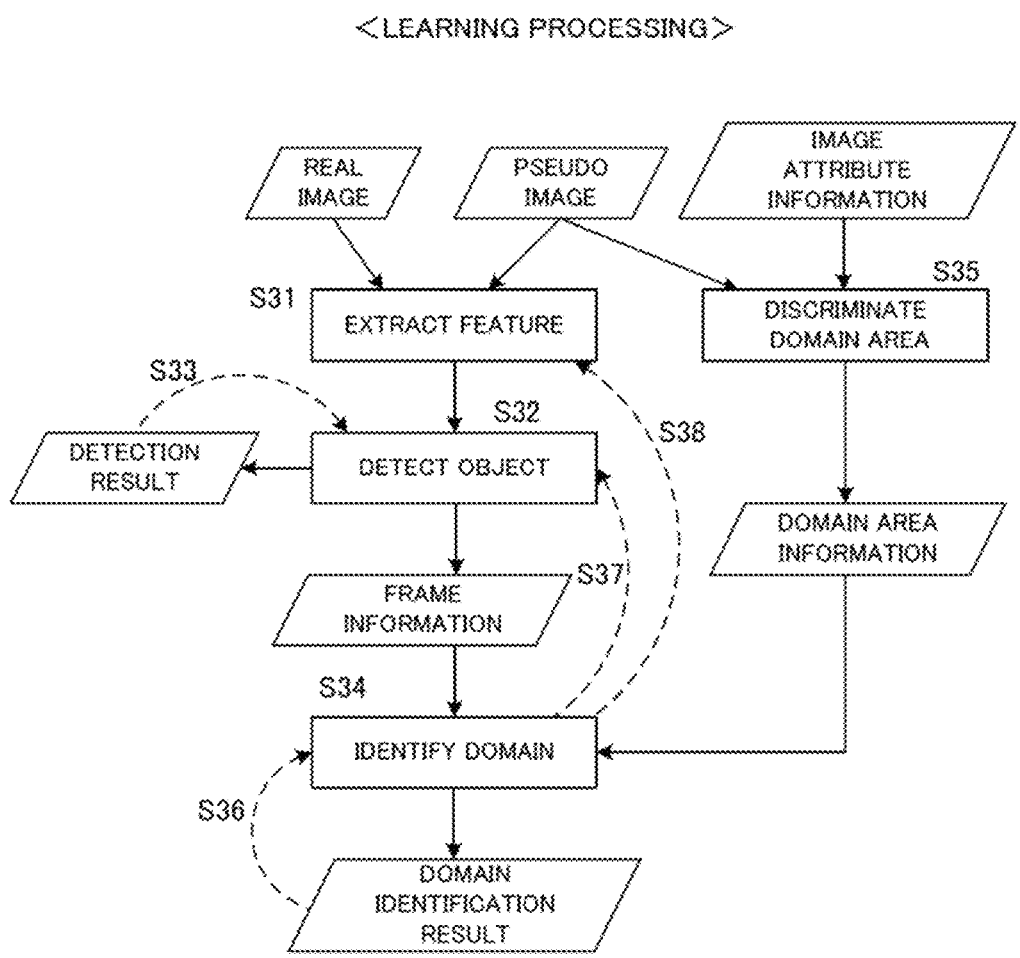
FIG. 8 is a flowchart of learning processing.

Next, the entire flow of the learning processing by the learning device 1 will be described. FIG. 8 is a flowchart of learning processing. This processing is realized by the processor 3 shown in FIG. 2, which executes a program prepared in advance to operate as each component shown in FIG. 4.

First, the feature extraction unit 21 performs feature extraction from the real images RI and the pseudo images PI given as the input images (Step S31). Specifically, the feature extraction unit 21 generates the feature maps FM from the real image RI and the pseudo image PI, and sets a plurality of frames for each cell of each feature map FM to generate the frame information FI.

Next, the object detection unit 22 performs object detection for each frame using the feature map FM and the frame information FI, and generates a detection result (Step S32). Also, the object detection unit 22 performs learning using the obtained detection results and the correct answer data prepared for the real images RI and the pseudo images PI (Step S33). Further, the object detection unit 22 supplies the frame information FI to the domain identification unit 23.

The domain identification unit 23 performs domain identification for each frame based on the frame information FI, and generates a domain identification result (step S34). In parallel, the domain area discrimination unit 24 discriminates the domain area based on the image attribute information AT (Step S35), and supplies the domain area information DA to the domain identification unit 23. The domain identification unit 23 generates correct answer data of the domain identification result for each frame based on the domain area information DA. Then, the domain identification unit 23 performs learning using the domain identification result obtained in step S34 and the correct answer data of the domain identification result (step S36).

When the domain identification unit 23 becomes possible to identify the domain by learning, the domain identification unit 23 supplies the domain identifiability information DD to the feature extraction unit 21 and the object detection unit 22. The object detection unit 22 learns common features that do not depend on difference in domains using the domain identifiability information DD (Step S37). Also, the feature extraction unit 21 learns common features that do not depend on difference in domains using the domain identifiability information DD (Step S38). Thus, the learning processing is executed.

(Object Detection Device)

Figure 9:
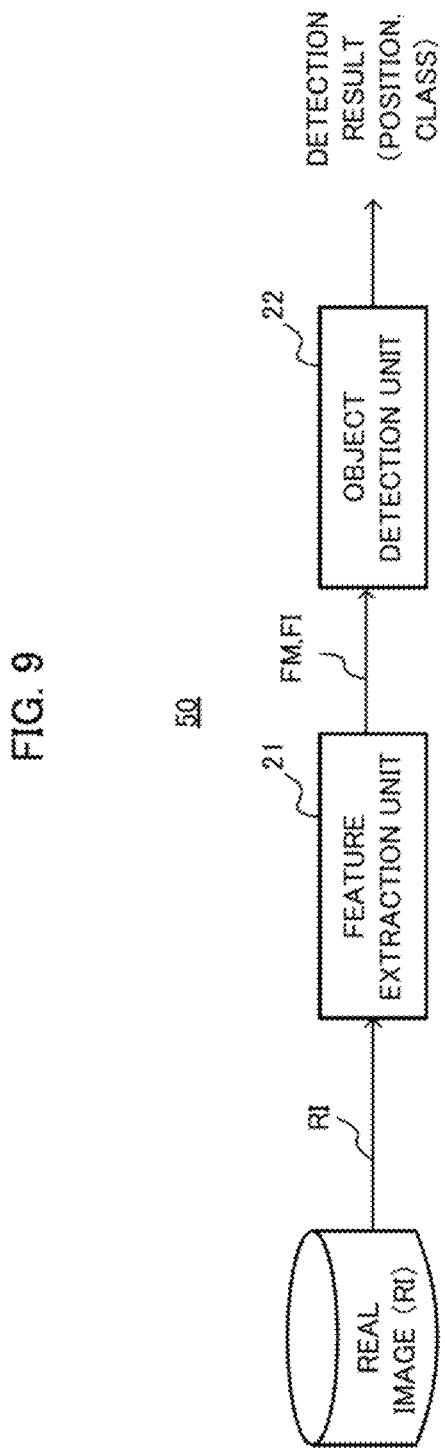
FIG. 9 is a block diagram showing a functional configuration of an object detecting device.

Next, the object detection by the object detection device for which the learning processing is completed will be described. The object detecting device is constituted by a terminal device such as a PC (Personal Computer) having a hardware configuration as shown in FIG. 2. FIG. 9 is a block diagram showing a functional configuration of the object detection device. The object detection device 50 is basically configured similarly to the object detection block of the learning device 1 shown in FIG. 4, and includes a feature extraction unit 21 and an object detection unit 22.

Figure 10:
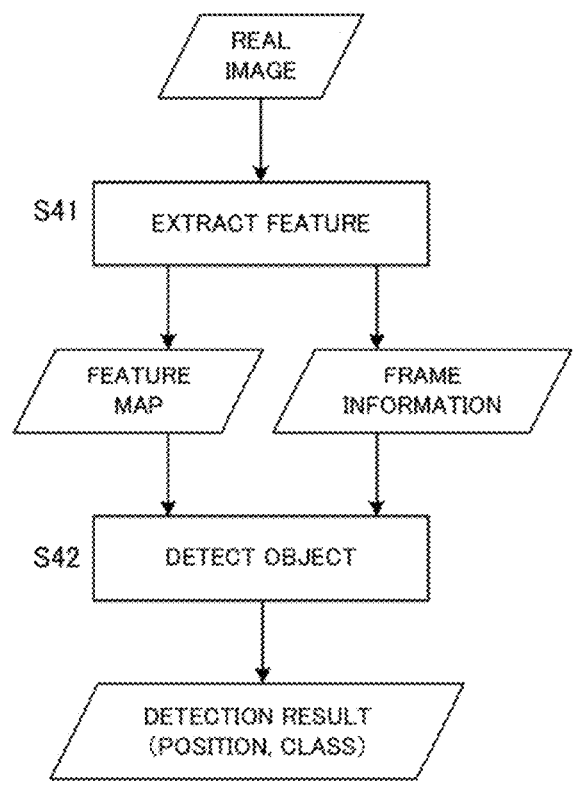
FIG. 10 is a flowchart of object detection processing by the object detection device.

FIG. 10 is a flowchart of the object detection processing by the object detection device 50. To the object detection device 50, the real image RI is inputted. The feature extraction unit 21 performs feature extraction from the inputted real image RI, generates the feature maps FM and the frame information FI, and outputs them to the object detection unit 22 (Step S41). The object detection unit 22 calculates the confidence of each class for each frame, integrates the overlapping frames to detect the object, and outputs the detection result (Step S42).

Second Example Embodiment

Figure 11:
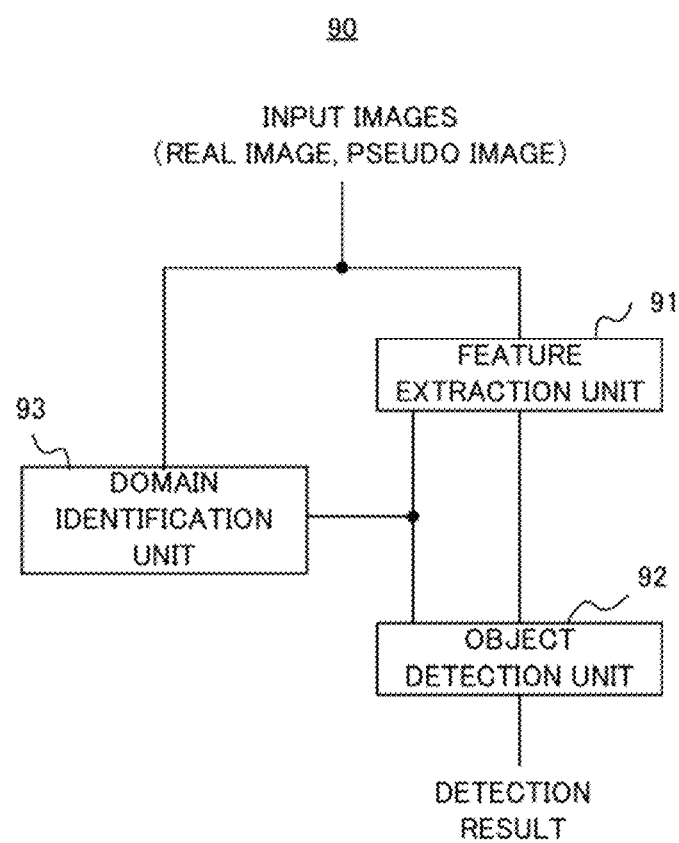
FIG. 11 is a block diagram showing a functional configuration of a learning device according to a second example embodiment.

Next, a second example embodiment of the learning device of the present invention will be described. FIG. 11 shows the functional configuration of the learning device according to the second example embodiment. The learning device of the second example embodiment also has a hardware configuration shown in FIG. 2.

The learning device 90 according to the second example embodiment includes a feature extraction unit 91, an object detection unit 92, and a domain identification unit 93. Input images including real images and pseudo images are inputted to the feature extraction unit 91 and the domain identification unit 93. The feature extraction unit 91 performs feature extraction from the input image to generate feature maps. The object detection unit 92 detects objects included in the input images based on the feature maps, and outputs detection results.

The domain identification unit 93 identifies the domains forming the input images, and outputs domain identifiability information. Then, the feature extraction unit 91 and the object detection unit 92 learn common features that do not depend on the difference in domains, based on the domain identifiability information. Thus, not only the real images but also the pseudo images can be used for the learning of the object detection device.

[Modification]

In the above-described example embodiments, plural frames are set for each cell of the feature map generated by the SSD. Instead, if the object learning and detection method (e.g., M2Det or RefineDet) using the frame (so-called Region Proposal) like the SSD is used, the frame and the feature map obtained from them may be used.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

1 Learning device
2 Interface
3 Processor
4 Memory
5 Recording medium
6 Database
11, 21, 91 Feature extraction unit
12 Confidence calculation unit
13 Frame integration unit
14, 23, 93 Domain identification unit
22, 92 Object detection unit
24 Domain area discrimination unit

What is claimed is:

1. A learning device comprising:
a memory storing instructions; and
one or more processors configured to execute the instructions to:
perform feature extraction from input images including real images and pseudo image to generate feature maps;
detect objects included in the input images based on the feature maps; and
identify domains forming the input images; and
output domain identifiability information,
wherein the processor is configured to learn common features that do not depend on difference in domains, based on the domain identifiability information.

2. The learning device according to claim 1,
wherein the processor is configured to generate frame information indicating frames set on the feature map,
wherein the processor is configured to detect the object for each frame, and
wherein the processor is configured to identify the domain for each frame.

3. The learning device according to claim 2, wherein the processor is configured to identify which one of a domain of real image data and a domain of pseudo image data an area defined by the frame of the input image corresponds to.

4. The learning device according to claim 3, the processor is further configured to generate domain area information indicating an area of pseudo image data in the pseudo image based on attribute information of the pseudo image,
wherein the processor is configured to generate correct answer data of domain identification results for each frame based on the domain area information, and perform learning of domain identification using the correct answer data.

5. The learning apparatus according to claim 4, wherein the processor is configured to generate the correct answer data of the domain identification result based on a positional relationship between the area of pseudo image data in the pseudo image and an area defined by the frame of the input image.

6. The learning device according to claim 1, wherein the domain identifiability information is information indicating a difference between the domain of real image data and the domain of pseudo image data.

7. The learning device according to claim 1, wherein the pseudo image is created by synthesizing the real image data and the pseudo image data.

8. An object detection device comprising a feature extraction unit and an object detection unit learned by the learning device according to claim 1.

9. A learning method of an object detection device for extracting a feature from an input image and detecting an object included in the input image, comprising:
   inputting input images including real images and pseudo images to the object detection device;
   identifying domains forming the input images to generate domain identifiability information; and
   making the object detection device learn common features that do not depend on difference in domains, based on the domain identifiability information.

10. A non-transitory computer-readable recording medium recording a program to execute learning processing of an object detection device including a computer, the object detection device extracting a feature from an input image and detecting an object included in the input image, the program causing the computer to:
   input input images including real images and pseudo images to the object detection device;
   identify domains forming the input images to generate domain identifiability information; and
   make the object detection device learn common features that do not depend on difference in domains, based on the domain identifiability information.

* * * * *